(12) United States Patent
Youssef

(10) Patent No.: US 11,262,211 B2
(45) Date of Patent: Mar. 1, 2022

(54) SYSTEM AND METHOD FOR 3D FLIGHT PATH DISPLAY

(71) Applicant: MILIAN INTERNATIONAL SOLUTIONS LIMITED, Victoria (SC)

(72) Inventor: Ahmed Youssef, Mangawhai Heads (NZ)

(73) Assignee: MILIAN INTERNATIONAL SOLUTIONS LIMITED, Victoria (SC)

( * ) Notice: Subject to any disclaimer, the term of this patent is extended or adjusted under 35 U.S.C. 154(b) by 351 days.

(21) Appl. No.: 16/320,665

(22) PCT Filed: Oct. 6, 2016

(86) PCT No.: PCT/IB2016/055971
§ 371 (c)(1),
(2) Date: Jan. 25, 2019

(87) PCT Pub. No.: WO2018/020303
PCT Pub. Date: Feb. 1, 2018

(65) Prior Publication Data
US 2019/0162555 A1    May 30, 2019

(30) Foreign Application Priority Data

Jul. 26, 2016 (NZ) ........................................ 722514

(51) Int. Cl.
*G01C 23/00* (2006.01)
*G08G 5/00* (2006.01)
(Continued)

(52) U.S. Cl.
CPC ........... *G01C 23/005* (2013.01); *B64D 43/00* (2013.01); *B64D 43/02* (2013.01); *B64D 45/04* (2013.01);
(Continued)

(58) Field of Classification Search
CPC ...... G01C 23/005; B64D 43/00; B64D 43/02; B64D 45/04; B64D 45/08; G08G 5/0021; G08G 5/0086; G08G 5/025
See application file for complete search history.

(56) References Cited

U.S. PATENT DOCUMENTS 3,589,648 A * 6/1971 Gorham ............... G05D 1/0676
244/186
3,825,180 A * 7/1974 Gallagher ................ G06G 1/14
235/78 R
(Continued)

OTHER PUBLICATIONS

PCT, International Search Report for PCT/IB2016/055971, dated Mar. 13, 2017.
(Continued)

*Primary Examiner* — Yazan A Soofi
*Assistant Examiner* — Naeem Taslim Alam
(74) *Attorney, Agent, or Firm* — Orrick, Herrington & Sutcliffe, LLP

(57) ABSTRACT

The invention relates to a display for 3D aircraft visualisation and flight path features. The display system is for use on the flight deck of an aircraft and comprises a display operable for graphical display of data, and a processor operatively coupled to the display and configured to receive terrain data from at least a terrain data base, flight plan data from a source of navigational data, and aircraft position data from one or more aircraft sensors. The processor is configured to operate the display to display a representation of the flight plan on the display screen, display a representation of the terrain proximate the flight plan representation, and display a representation of the aircraft relative to the flight plan and the terrain.

12 Claims, 5 Drawing Sheets

(51) Int. Cl.
*G08G 5/02* (2006.01)
*B64D 45/08* (2006.01)
*B64D 45/04* (2006.01)
*B64D 43/00* (2006.01)
*B64D 43/02* (2006.01)

(52) U.S. Cl.
CPC ........... *B64D 45/08* (2013.01); *G08G 5/0021* (2013.01); *G08G 5/0086* (2013.01); *G08G 5/025* (2013.01)

(56) References Cited

U.S. PATENT DOCUMENTS

| | | | | |
|---|---|---|---|---|
| 3,988,713 | A * | 10/1976 | Bateman | G08G 5/025 340/970 |
| 4,121,287 | A * | 10/1978 | Leal | G01S 13/935 701/301 |
| 5,884,223 | A | 3/1999 | Tognazzini | |
| 6,690,299 | B1 | 2/2004 | Suiter | |
| 6,980,892 | B1 | 12/2005 | Chen et al. | |
| 7,477,164 | B1 | 1/2009 | Barber | |
| 7,693,621 | B1 * | 4/2010 | Chamas | G08G 5/0021 701/16 |
| 7,706,979 | B1 * | 4/2010 | Herwitz | G08G 5/045 701/301 |
| 7,869,943 | B1 * | 1/2011 | Simon | G01C 23/005 701/436 |
| 8,019,491 | B1 | 9/2011 | McCusker | |
| 10,043,402 | B1 * | 8/2018 | Alvarez | G01C 23/005 |
| 2003/0195672 | A1 | 10/2003 | He | |
| 2003/0222887 | A1 | 12/2003 | Wilkins, Jr. et al. | |
| 2004/0111192 | A1 | 6/2004 | Naimer et al. | |
| 2004/0225420 | A1 * | 11/2004 | Morizet | G08G 5/0086 701/3 |
| 2005/0024237 | A1 | 2/2005 | Gannett | |
| 2005/0206533 | A1 * | 9/2005 | Rogers | G01C 23/00 340/979 |
| 2006/0074559 | A1 | 4/2006 | Meunier | |
| 2006/0241820 | A1 | 10/2006 | Dwyer et al. | |
| 2007/0010921 | A1 * | 1/2007 | Ishihara | G08G 5/025 701/16 |
| 2010/0106419 | A1 | 4/2010 | Flotte et al. | |
| 2011/0025530 | A1 | 2/2011 | He | |
| 2011/0106447 | A1 * | 5/2011 | Wise | G02B 27/01 701/431 |
| 2011/0171611 | A1 | 7/2011 | Batcheller et al. | |
| 2014/0074324 | A1 | 3/2014 | Burgin et al. | |

OTHER PUBLICATIONS

NZ, First Examination Report, Application No. 724931, dated Mar. 1, 2017.

NZ, Further Examination Report, Application No. 724931, dated Dec. 22, 2017.

NZ, Further Examination Report, Application No. 724931, dated Apr. 10, 2018.

* cited by examiner (a)

(b)

(c)

(d)

SYSTEM AND METHOD FOR 3D FLIGHT PATH DISPLAY

FIELD OF THE INVENTION

The invention relates to a display for an aircraft, and more particularly to a display for 3D aircraft visualisation and flight path features.

DISCUSSION OF THE PRIOR ART

Instrument approach procedures (IAP) are traditionally presented to pilots in either a paper format or as a two-dimensional chart on a computer screen. The paper format has been in existence for over eighty years. Misinterpretation of these charts has been a lead contributing factor to many aircraft accidents, known as "Controlled Flight Into Terrain" (CFIT), where an airworthy aircraft, under pilot control, is unintentionally flown into the ground, a mountain, a body of water or obstacle.

Since records started in 1919 there have been over 30,000 lives lost in 395 airline accidents identified as CFIT, figures that do not include General Aviation, Business or Military aircraft. The leading cause of CFIT is loss of situational awareness by the pilots.

A current solution to mitigate CFIT is the Enhanced Ground Proximity Warning System (EGPWS) also known as Terrain Awareness Warning System (TAWS). This system relies on a terrain database interfaced with position information from the aircraft's navigation system to provide a reactive warning system in the form of an aural warning to the pilot and a coloured display on the aircraft navigation display.

However, identified disadvantages of this type of system include that the system can be turned off, the system primarily provides aural warnings which is a sense that is diminished when the pilot is under stress, the system reacts only when the aircraft is close to a collision, the provision of warning alarms can create further stress on the pilot as it can cause confusion around where the aircraft is in relation to the terrain.

Further, conventional charts available to the pilot display a large amount of information, much of which is relevant only to certain stages of the flight. As the pilot workload increases during an instrument approach or departure the ability of the pilot to extract the required information is diminished, thereby impeding their ability to acquire and/or maintain the level of situational awareness required to avoid CFIT incidents/accidents.

It is an object of the invention to go at least some way toward overcoming or at least ameliorating the one or more of the above mentioned problems or disadvantages, or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY OF THE INVENTION

In one broad aspect the invention consists in a display system for use on the flight deck of an aircraft comprising: a display operable for graphical display of data, and a processor operatively coupled to the display and configured to receive: terrain data from at least a terrain data base, flight plan data from a source of navigational data, and aircraft position data from one or more aircraft sensors, wherein the processor is configured to operate the display to: display a representation of the flight plan on the display screen, display a representation of the terrain proximate the flight plan representation, and display a representation of the aircraft relative to the flight plan and the terrain.

In another broad aspect the invention consists in a method of generating a visual display for use on a display on flight deck of an aircraft, the method comprising: receiving terrain data from a terrain data base, receiving flight plan data from a source of navigational data, and receiving aircraft position data from one or more aircraft sensors, then, on the display: displaying a representation of the flight plan on the display screen, displaying a representation of the terrain proximate the flight plan representation, and displaying a representation of the aircraft relative to the flight plan and the terrain.

In another broad aspect the invention consists in a non-transitory computer readable medium storing a program causing a computer to execute a visual display generating process, the process comprising: receiving terrain data from a terrain data base, receiving flight plan data from a source of navigational data, and receiving aircraft position data from one or more aircraft sensors, then, on the display: displaying a representation of the flight plan on the display screen, displaying a representation of the terrain proximate the flight plan representation, and displaying a representation of the aircraft relative to the flight plan and the terrain.

In some embodiments, the terrain data comprises altitude data and location data representative of geographical terrain features, and the processor is further configured to generate the representation of the terrain by providing a sphere by representing earth and populating the sphere with the terrain data.

In some embodiments, the flight plan comprises at least two waypoints, the waypoints having location and altitude data, and the processor is configured to generate the representation of the flight plan by rendering a line spanning between the at least two waypoints.

In some embodiments, the position data comprises heading, track, pitch and roll data and the processor is configured to display a representation of the aircraft that is pitching or rolling according to the pitch and roll sensors, and pointed in the direction provided by the heading sensor.

In some embodiments, the processor is further configured to operate the display to show a graphical indication of the altitude difference between the aircraft and the desired flight path.

In some embodiments, the processor is configured to, during an airport approach flight phase, determine the aircraft is above or below the desired flight path and determine a desired rate of descent of the aircraft that will intercept the desired flight path at or before the runway, and the processor is further configured to operate the display to show a representation of the desired rate of descent of the aircraft.

In some embodiments, the displayed rate of descent is graphically represented as a glide slope.

In some embodiments, the processor is further configured to generate a warning when the aircraft is outside one or more of a horizontal displacement from the desired flight path and/or a vertical displacement from the flight path.

In some embodiments, the processor is further configured to generate a warning when the aircraft is outside one or more of a horizontal angular displacement and/or a vertical angular displacement thresholds from the flight path.

In some embodiments, the angular vertical displacement from the flight path is determined by the vertical angular difference between: a vector from a touchdown location to the aircraft and a vector horizontal to the altitude of the touchdown location, and a vector from the touchdown location to the desired aircraft position and a vector horizontal to the altitude of the touchdown location.

In some embodiments, the horizontal angular displacement from the flight path is determined by the horizontal angular difference between: a vector from a touchdown location to the aircraft and a vector horizontal to the altitude of the touchdown location, and a vector from the touchdown location to the desired aircraft position and a vector horizontal to the altitude of the touchdown location.

In some embodiments, the warning comprises at least one of a graphical warning provided to the display and/or generating an output operable to generate an audible alert.

In some embodiments, the displacement thresholds comprise two or more warning thresholds, the processor is configured to implement a new and/or intensified alert at each threshold.

In some embodiments, the processor is further configured to: determine the aircraft is above the desired flight path, determine a touchdown location and altitude, determine the glide slope for the aircraft to meet the touchdown point, and output a warning if the determined glide slope is above a predetermined safe limit.

In some embodiments, the processor is further configured to allocate a surface area grid to terrain located below the aircraft, receive data relating to the peak altitude of terrain and a terrain risk parameter located in each segment of the grid from the terrain database, and display a representation of a floor at an altitude above the peak in each grid segment according to the risk parameter of the terrain in that segment.

In some embodiments, the risk parameter is deemed high for mountainous terrain located in a grid segment, and the representation of the floor is displayed at a higher altitude for grid segments with a high risk parameter.

In some embodiments, the representation of the floor is displayed at 2000 ft for grid segments with a high risk parameter.

In some embodiments, the representation of the floor is displayed at 1000 ft for grid segments that do not have a high risk parameter.

In some embodiments, the representation of the floor is a translucent region that overlays the terrain in each grid segment.

In some embodiments, the representation of a floor is displayed at a first colour when the aircraft is located above, and another colour when the aircraft is below.

In some embodiments, the processor is configured to generate at least one of an audible or visual warning when the aircraft is located below the floor.

The following embodiments may relate to any of the above aspects. Other aspects of the invention may become apparent from the following description which is given by way of example only and with reference to the accompanying drawings.

As used in this specification, the term "and/or" means "and" or "or", or both.

As used herein, "computer-readable medium" excludes any transitory signals but includes any non-transitory data storage circuitry, e.g., buffers, cache, and queues, within transceivers of transitory signals.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION

According to some embodiments of the systems and methods disclosed herein, a comprehensive flight data analysis and display system may be provided. In particular, the provision of a three dimensional rendering of a flight path according to embodiments described herein, facilitates a pilot with better spatial understanding of the planned flight path, thereby reducing the navigational workload for a flight crew.

When a 3D terrain representation is used as an underlay for a 3D flight path display, the relative positioning of the flight path relative to the terrain can be readily identified. This aids in detecting potential flight path conflicts with terrain as well as planning for optimal paths around potentially hazardous areas.

A 3D flight path display with a terrain underlay will also significantly enhance the perception of depth and relative location during the flight path visualization therefore reducing flight crew work load and providing more timely information about potential dangers along the flight path. Incidents and accidents attributed to misinterpretation of instrument approach and departure charts are able to be reduced or eliminated. Further, the need for the pilot to create a mental picture of the aircraft position in space relative to the surrounding terrain is visually assisted.

Figure 1:
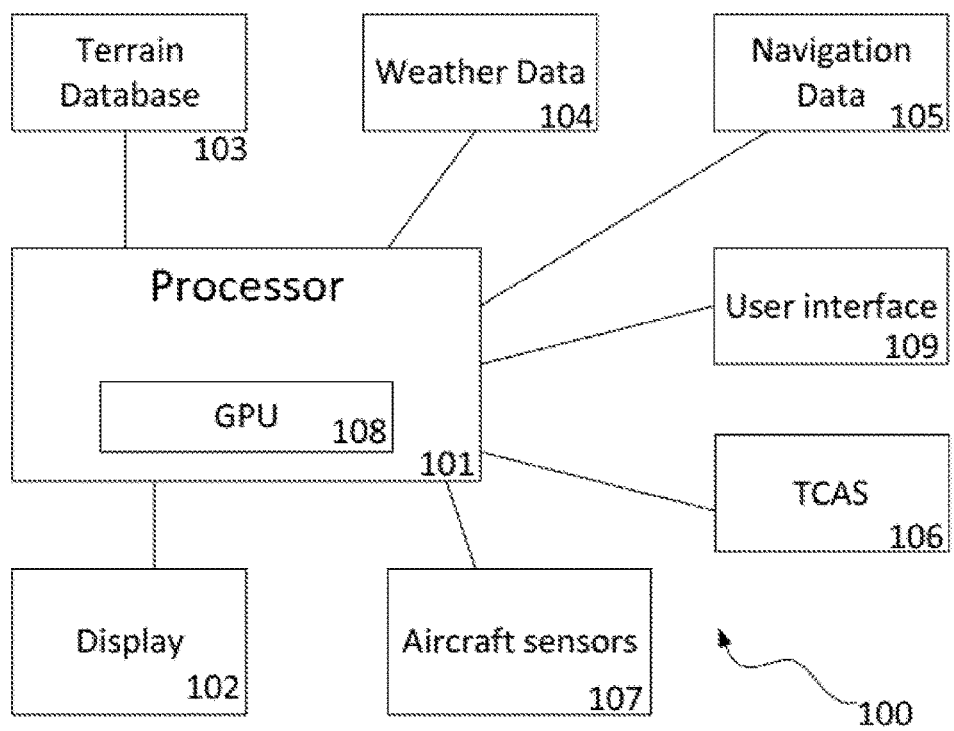
FIG. 1 shows an exemplary system component diagram.

FIG. 1 illustrates an exemplary implementation of a system 100 according to a preferred embodiment, including exemplary informational inputs and outputs. In particular, the system 100 is an exemplary flight management display system that includes a processor 101 configured to provide information to a display element or monitor 102.

One or more data sources are coupled to the processor 101. These data sources may include:
a terrain database 103,
a weather data source 104 from a weather sensing unit on-board the aircraft or from an external weather data source such as a ground-based weather data source or a satellite weather data source,
a navigation database 105,
a traffic and collision avoidance system (TCAS) 106,
a user input or user interface 109, or
other sensors 107 which may provide additional useful information to a user.

Processor 101 encompasses one more functional blocks used to provide a flight management, navigational, weather, terrain, and positional interface with the pilot, and input to display element 104. The processor 101 may be configured to receive, analyse, condition, and process navigation and positional information, including flight path information as well as weather information associated with the aircraft.

Processor 101 may be implemented by any number of individual microprocessors, flight computers, navigation equipment, memories, storage devices, interface cards, and other standard components known in the art. For example, in some embodiments, the processor 101 may include a dedicated graphics processing unit 108 for generating graphical information to allow processor 101 cycles to be dedicated to other computational tasks such as the processing of data from the aircraft.

Processor 101 may include any number of microprocessor elements, memory elements, power supplies, and other functional components as necessary to support the operation of the display 102. In this respect, processor 101 may include or cooperate with any number of software programs or instructions designed to carry out various methods, process tasks, calculations, control functions, and the generation of display signals and other data used by display 102. For example, processor 101 may be configured to create a data stream for presentation to the display 102.

Processor 101 may also be configured to receive and process navigational data from the navigation database 105 relating to intended flight path and destination of the aircraft. For example, navigational data 105 may include waypoints, airports, navigational aids, holding patterns, arrival flight paths and departure flight paths.

Processor 101 may process data from any of the data inputs and generate appropriate signals for visual display, where the display element 102 generates indicia, typically graphics, representative of the appropriate navigational, weather, terrain, or other information.

Display element 102 may include any display element suitable for displaying the various symbols and information detailed below, for example CRT and flat-panel display systems. Display element 102 may be based on a panel mounted display, a HUD projection. In an exemplary embodiment, display element 102 includes a panel display. In a further exemplary embodiment, the display element 102 is incorporated in to a smart mobile device such as a smart phone, laptop or tablet. In such an embodiment, processor 101 may be implemented by the primary processor associated with the smart mobile device.

In operation, the processor 101 obtains aircraft position, speed, direction and direction data from the sensors 107. Based on this data, the processor 101 obtains terrain data from the terrain database 103 and navigation data from the navigation database 105. These databases 103, 105 are typically on-board the aircraft, but need not be limited to.

In some embodiments, the sensor 107 and/or display 102 are provided by the electronic flight bag of an aircraft. In its simplest form, electronic flight bag(s) can perform basic flight planning calculations and display a variety of digital documentation, including navigational charts, operations manuals, and aircraft checklists. The most advanced electronic flight bags are fully certified as part of the aircraft avionics system and are integrated with aircraft systems. Advanced electronic flight bags are also able to display an aircraft's position on navigational charts, depict real-time weather, and perform many flight-planning tasks.

Existing display systems can be modified using known techniques to support the image generation and display aspects to support the different features described herein. For example, in a practical implementation, the display and processor of a smart device may be utilised to implement the features described herein. In some embodiments, a smart device may already be in use to implement, or at least be part of, the electronics flight bag of an aircraft.

Terrain and Hazard Display

In some embodiments, the terrain data includes altitude data of points of interest such as mountains and buildings, and the location of those altitude points. The processor 101 is configured to render a picture of the surrounding terrain by generating a sphere representing planet earth, then overlaying that sphere with data points that include altitude data and location data that represents geographical features of the terrain, buildings and other potential aircraft hazards. The processor then generates a mesh which drapes from the top of each data point to surface of the sphere. A terrain feature may have two or more altitude and location data points so as to create a 3D profile closely representative of the real terrain yet use a sparse amount of data in doing so. In this way, a reasonably accurate 3D map is generated.

The processor 101 is configured to receive sensor data 107 indicative of the present position of the aircraft. The processor is configured to then generate a rendering of the aircraft according to its present roll, heading, track and pitch angle for display on the 3D terrain rendering at the present altitude. The pilot is thereby provided with a graphical representation of the present aircraft position relative to the terrain proximate the aircraft.

The pilot is therefore above to be provided with a visual representation of the aircraft relative to the surrounding terrain. The processor 101 renders a picture of the aircraft, the terrain surrounding the aircraft, and other points of interest such as navigation data and airports. The processor may be configured to render only a portion of the terrain proximate the aircraft. For example, a 10 kilometer radius around the aircraft may be rendered. Further, the processor may render the terrain portions along the flight path of the aircraft.

In some embodiments, weather related information may also be displayed. For example, sensors 107 may include weather data such as rain or wind information or a communication link to a source of weather data 104. The processor 101 is configured in such instances to render a graphical indication of the weather data on the display 102.

Display of Flight Path

Furthermore, the pilot is provided a graphical representation of the present aircraft position relative to the desired position defined by the flight path. These features contribute toward improved situational awareness of the pilot. The flight path may also be rendered on the display element 102. The flight path may be represented by a line in 3D space which represents the desired aircraft position.

The flight path may be derived from navigation data, such as two or more waypoints and the desired altitude of the waypoint. For example, the processor 101 may be configured to receive two or more waypoints from the navigational database 105 which represent positions in 3D space. The processor 101 may then graphically represent the flight path as a line in 3D space that spans between the two waypoints. A typical flight will have numerous waypoints that track a flight path from runway to runway. Therefore, the path of a complete flight may be rendered.

Display of the aircraft and surrounding terrain features promotes visualisation of many parts of an entire flight, for example, departure, arrival, approach, holding pattern if required and missed approach if required. Each of the flight parts may be rendered as a desired flight path relative to the surrounding terrain in a continuous manner, rather than individual scenarios. In this way, CFIT situations can be mitigated by proving the pilot with a visual representation of the desired flight path through various phases of flight relative to their aircraft position.

Figure 2:
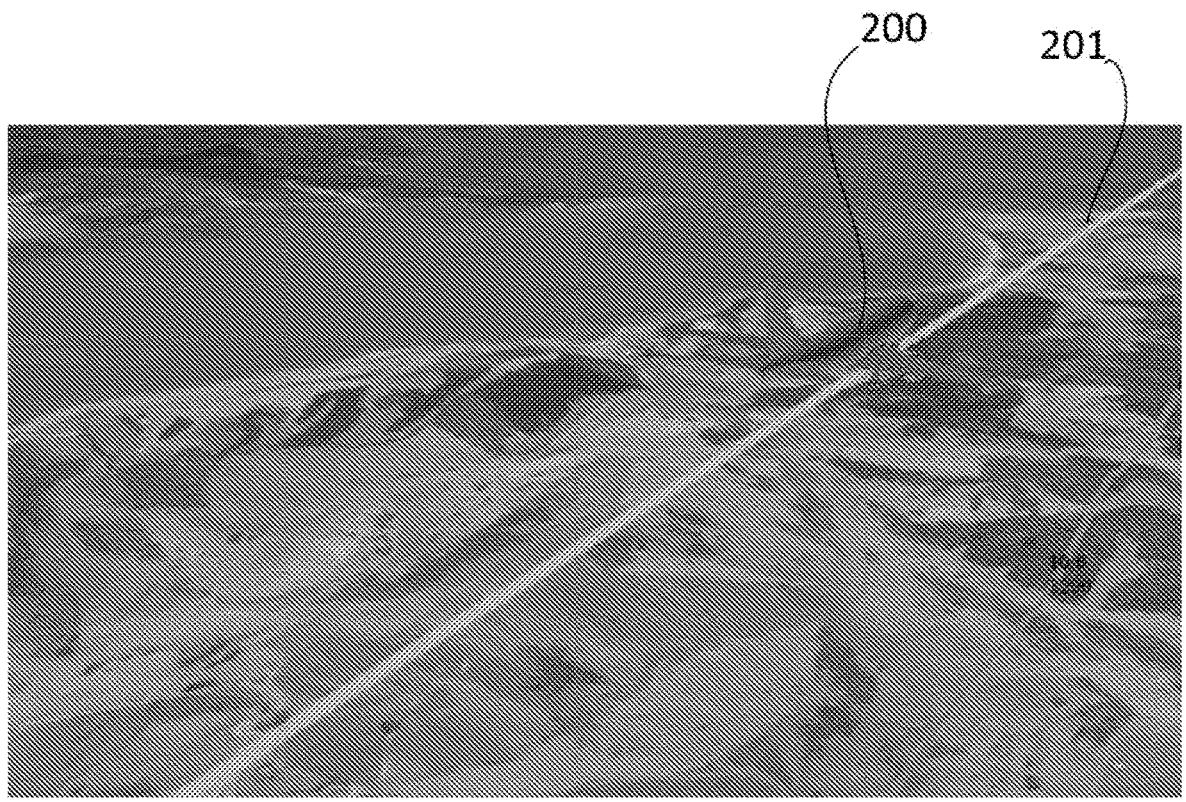
FIG. 2 shows an example rendering of an aircraft and a flight path.

FIG. 2 shows an example rendering of an aircraft 200 and a flight path 201.

The data about the aircraft state will need to be retrieved from the aircraft itself. The position (in 3-space) heading, pitch and roll. Data about the aircraft velocity is useful, but can be derived, for example, from position information provided by GPS.

The aircraft position can be entered into the software program similarly to the case of a single point and attached to a symbol used to represent the aircraft, so the aircraft symbol is placed according to where the data says the aircraft is. The heading, pitch and roll is used to rotate the rendering of the aircraft 200 so that it visually represents the state of the aircraft.

According to one embodiment, the processor is configured to render a 'pilot view' feature that allows the operator to view an approach or departure as if looking through the aircraft windscreen in the direction of travel but seeing the required flight path in front of them with any flight path restrictions along with the surrounding terrain.

Holding Pattern Display

In a further embodiment, the processor is configured to determine a holding pattern. For example, if the aircraft is to enter a holding pattern, then the pilot can select the point at which the holding pattern is to be carried out. For example, the user input 109 may be used to enter holding pattern information including the direction of the turns and the inbound track of the holding pattern.

The display will show the pilot the correct entry procedure for initiating the holding pattern. The display will show any limitations that the regulatory authority has placed on that holding pattern.

Figure 3:
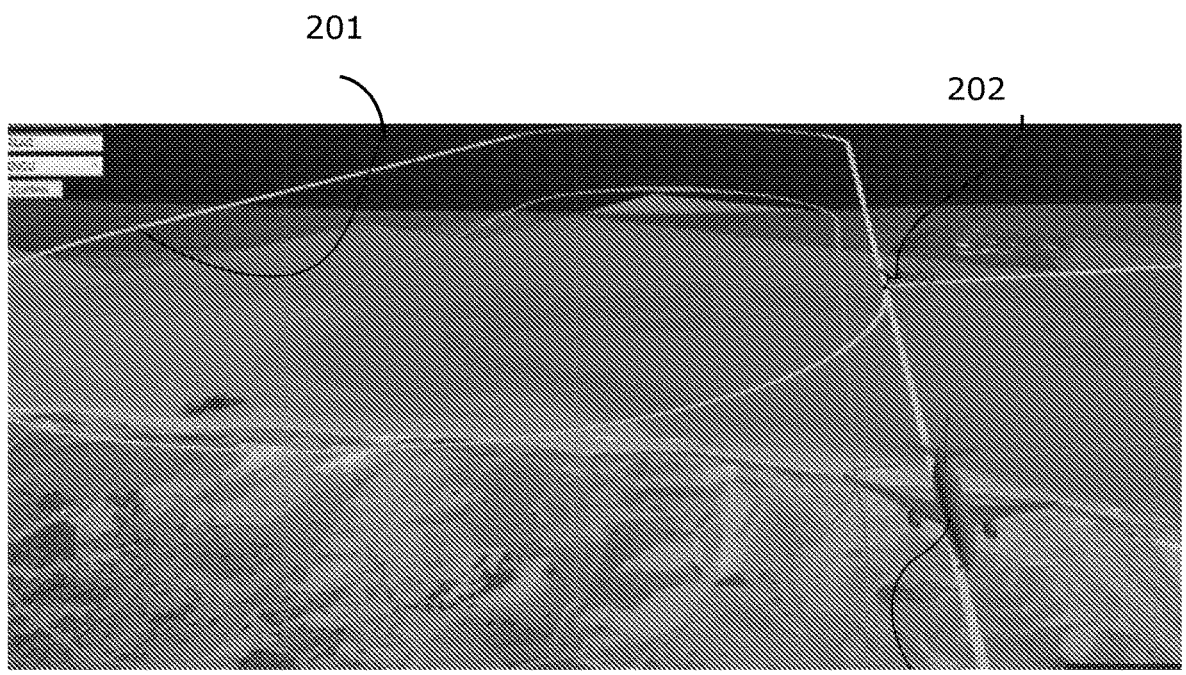
FIG. 3 shows an example rendering of the flight path of a holding pattern including the aircraft position and a waypoint or checkpoint.

FIG. 3 shows an example rendering of the flight path of a holding pattern 201 including the aircraft position and a waypoint or checkpoint 202.

To generate a hold, it is necessary to know the origin point (usually a checkpoint) around which the hold will be based, the inbound heading, the hold speed (the default hold speed is an application setting) and whether the hold will be left or right handed hold.

To generate the holding pattern, the processor is configured to undertake the following steps:

1. Determine a checkpoint and starting direction of the inbound heading. This information may be input from the pilot or received from ground communications.

2. Generate a semi-circle with an arc length equal to one-minute flight time, turning in the specified direction. The required radius of the length of the semi-circle is determined using the formula for the circumference of a circle, $2\pi r$. So to get an arc length of k, the radius of the semi-circle must be $k/\pi$.

The centre of the semi-circle is determined by taking a line perpendicular to the inbound heading, the side chosen according to whether it is a left or right handed hold.

The processor determines points around the semi-circle by converting the distances to degrees at the equator, taking calculations naively and dividing the longitudinal component of the radius by the cosine of the latitude.

3. Extend a straight flight section for a length of one minute's flight time beginning from the end of the semi-circle, 4. Generate a next semi-circle by the manner outlined at step 2.

5. Lastly, generate a final straight to get back to the starting point of the holding pattern.

The length and direction of the straights are known. There are well known formulae for calculating the end point of such a line and these have been used. A flat plane is then taken through the centre of the earth, the start and end points of the straight line and the straight line is traced along the intersection of this plane and the globe at the checkpoints height above sea level (choosing the shorter path). This the shortest path between the two endpoints, the equivalent of a straight line path on a globe.

The processor 101 is configured to render the lines as a path in three dimensions in the display 102.

Glide Slope Calculation

When a pilot is to conduct an instrument approach, a flight path with a defined rate of descent or glide slope is desired. However, the pilot may find they are attempting to intercept the desired or required flight path from an altitude that is higher or lower than optimum. In this situation, the pilot has to attempt to intercept the desired or required flight path and have the aircraft in the appropriate configuration (landing gear, flaps and speed) at a designated altitude.

In the event the aircraft is not configured appropriately by set point before landing, the pilot is obligated to carry out a "missed approach".

Figure 7:
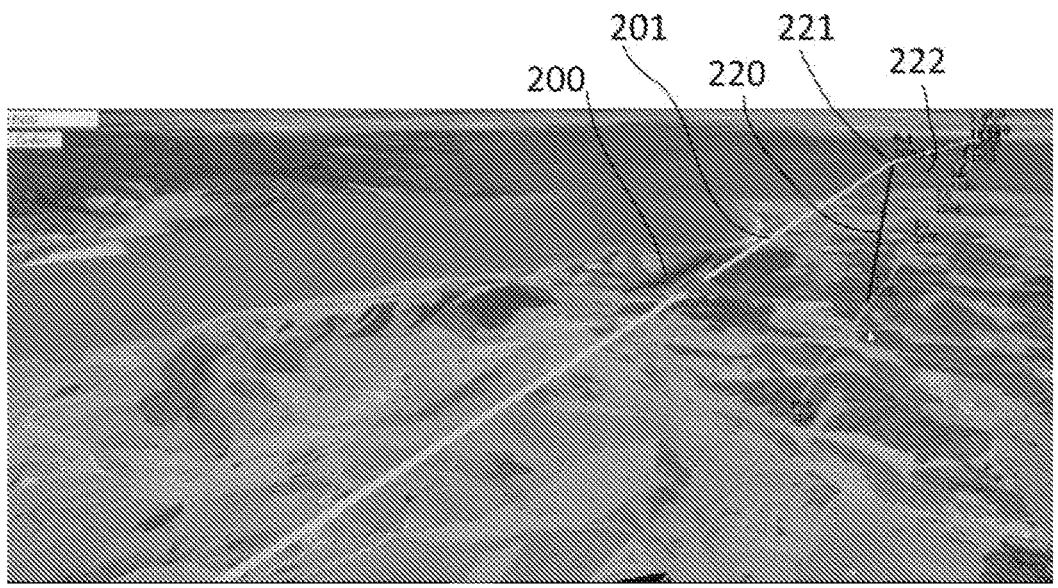
FIG. 7 shows an example of an aircraft approaching a runway and a desired flight path.

FIG. 7 shows an example of an aircraft 200 approaching a runway and the desired flight path 201 that including the desired rate of descent until the runway is intersected. The aircraft must begin descending by a certain distance from the runway, such as a designated waypoint 221. The altitude 220 of the waypoint 221 may also be shown. The flight path 222 is exemplary of the fairly unsteady path an aircraft may take when attempting to control the rate of descent. In circumstances where the descent rate is unsteady, the pilot will often have difficulty ensuring the aircraft is in the correct state for landing and will often have to carry out the missed approach to try again.

According to a varied embodiment, the pilot is provided with a display of the required or corrected rate-of-descent to regain the required flight path prior to an operator determined point on the approach. Display of the descent rate may be provided by a numeric rate value that the pilot can match to their instrumentation, and preferably is further assisted by the display of a flight path the aircraft is to match to in order to match the desired flight path once more. As above, display of the desired flight path is shown in 3D over a terrain map. A secondary line is provided as a pathway back to the desired flight path.

The processor 101 is configured to user received knowledge of the aircraft 200 position and calculate the aircraft trajectory. Comparison between the trajectory and the desired flight path may then be determined. The processor 101 is further configured to calculate a rate of decent that will ensure the aircraft either lands correctly, or is at the correct altitude by a certain distance from the runway. A corrected rate of decent value, and matching flight path can then be output to the display element 102 for the pilot.

The following is an example of a mathematic process for calculating a corrected rate of descent. Other alternate mathematical methods may be used. For the purposes of this example, distance and altitudes are presented in meters and coordinates are given in degrees, (longitude, latitude, altitude). True heading (rather than magnetic heading) is used.

In this example, there is an aircraft attempting to land at Auckland airport. The touchdown point on the airport runway is at (174.771, −37.016, 4.572) and at the time of this calculation the aircraft is at (174.717964, −37030981, 182.88).

We wish to calculate two values to determine if the aircraft is close enough to the glide slope. The two values will also be used to find the required rate of decent to reach the glide slope above a safe altitude.

The first value is the horizontal angle between the glide slope and the line connecting the aircraft and the touchdown point (the angle you would see if you were to look straight down from above). This will tell us if the aircraft is drifting too far sideways.

The second value is the vertical angle between the glide slope and the line connecting the aircraft and the touchdown point (the angle you would see if you were to look horizontally from the side).

To detect when the altitude of an aircraft is too high or low in a descent the processor 101 is configured to determine:
  the current rate of descent,
  the location of the aircraft and
  the trajectory of the aircraft.

The rate of descent itself is determined by calculating the change in altitude of the aircraft over a defined amount of time such as, for example, one minute. The processor 101 is configured to determine the aircraft altitude at a first time, then after an elapsed period of time, determine the aircraft altitude.

Aircraft Too Low

To determine if the aircraft is too low, the processor 101 is configured to determine three points of a first in triangle relating to the vertical angle:
(A) the location of the touchdown point,
(B) the current location of the aircraft, and
(C) the point directly below the aircraft at the same altitude of the touchdown point is found.

This forms a right angle triangle so the angle BAC can be calculated.

The processor 101 is also configured to determine three points of a second triangle to determine the horizontal angle:
(D) a line is traced perpendicular to the descent line from the aircraft to where it intersects the descent line.
(C) the point directly below the descent line but at the same altitude as the touchdown point is found
(A) the location of the touchdown point.

This forms another right angle triangle so the angle DAE can be calculated.

Figure 8:
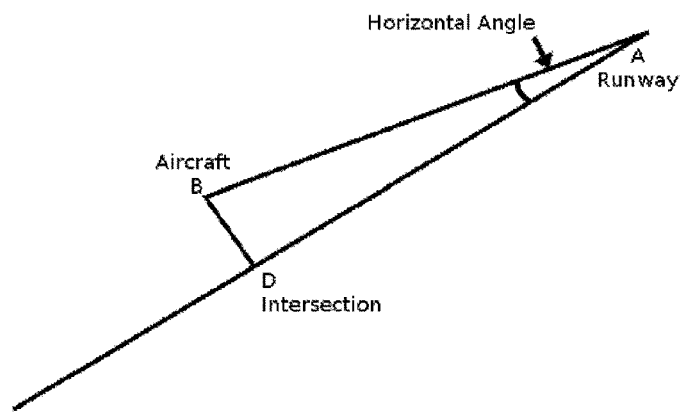
FIG. 8 shows a horizontal angle to be calculated.
Figure 9:
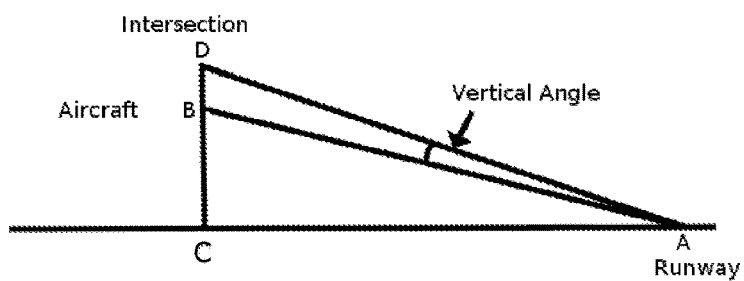
FIG. 9 shows a vertical angle to be calculated.

FIG. 8 illustrates the horizontal angle and FIG. 9 illustrates the vertical angle to be determined.

In an orthogonal vector space, altitude is ignored for the first calculation as the change in the altitude has no effect on the horizontal angle. In 3D space, there is no difference between the horizontal and vertical planes.

To determine the horizontal and vertical angles, the following exemplary process is used. In preferred embodiments, the processor 101 is configured to make this calculation at regular intervals, such as and including the rate at which sensor values such as the aircraft position are updated.

To determine the horizontal angle, the first step of the process is to determine a line perpendicular to the glide slope (as if the glide slope was horizontal) that goes through the aircraft and find where this intersects the glide slope. If we were to take the shadow of the glide slope on the ground, put a right angle to it and slide it along the glide slope until the right angle points to the shadow of the aircraft, this location for the right angle is what we are trying to find.

The glide slope in this example has a heading of 70 degrees, meaning the perpendicular line has a heading of either 160 degrees or 340 degrees (they will both give the same answer). Both the glide slope and the perpendicular line form a great circle (a loop centred in the centre of the earth) that intersect in two points. Calculating the intersection directly is a bit complicated, so instead we convert to a vector representation of the great circles in Cartesian coordinates:

$$C_0 = \begin{pmatrix} x_0 \\ y_0 \\ z_0 \end{pmatrix}$$

The function $f(x, y, z) = x \ast x_0 + y \ast y_0 + z \ast z_0$ describes the plane that the great circle for C sits on. If we wish to find the points at which two great circles C1 and C2 intersect we can simply take the cross product $C_1 \times C_2$ to find one point of intersection, and the negative of this to find the other. The nearest point to our aircraft will be the one we are looking for.

To complete these calculations, we need a few more formulae. For a point A, we take $A_x$ to be the longitude and $A_y$ to be the latitude. To convert from a point A and a heading h to a great circle $C_0$ we take:

$$C_0 = \begin{pmatrix} \sin(A_x) \ast \cos(h) - \sin(A_y) \ast \cos(A_x) \ast \sin(h) \\ -\cos(A_x) \ast \cos(h) - \sin(A_y) \ast \sin(A_x) \ast \sin(h) \\ \cos(A_y) \ast \sin(h) \end{pmatrix}$$

To get the cross product we take:

$$C_1 \times C_2 = \begin{pmatrix} x_1 \\ y_1 \\ z_1 \end{pmatrix} \times \begin{pmatrix} x_2 \\ y_2 \\ z_2 \end{pmatrix} = \begin{pmatrix} y_1 \ast z_2 - y_2 \ast z_1 \\ x_1 \ast z_2 - x_2 \ast z_1 \\ x_1 \ast y_2 - x_2 \ast y_1 \end{pmatrix}$$

Finally, to convert from a vector to coordinates, we take:

$$A_x = \arctan(y_0/x_0)$$

$$A_y = \arctan(z_0/\sqrt{x_0^2+y_0^2})$$

To perform the calculation, we take the touchdown point as A, the location of the aircraft as B, the glide slope heading as h and the perpendicular heading as k (the values of all of these are given above). Plugging A and h, along with B and k into the great circle formula, then take the cross product of the two resulting vectors. Converting back to coordinates gives X=(5.27583, 37.0255). This is clearly the antipodal point to the one we were looking for, so the location of the intersection D is (174.72417, −37.0255).

We now have the positions of the vertices of a right angled triangle. If we calculate the distances between the vertices, we can use simple trigonometry to get the angle we want.

Again, this is easier to do with vectors. While we will already know D as a vector from the previous calculation we will need to convert points A and B the aircraft and touchdown points. This is done with this formula:

$$C_0 \begin{pmatrix} x_0 \\ y_0 \\ z_0 \end{pmatrix} = \begin{pmatrix} \cos(A_y) * \cos(A_x) \\ \cos(A_y) * \sin(A_x) \\ \sin(A_y) \end{pmatrix}$$

Then, to find the distances we take:

$$d = r * \arctan(|C_1 \times C_2|/C_1 \cdot C_2)$$

Where r is the radius of the earth. 6378.14 is sufficiently accurate for r at this time.

Providing D and B into these formulae gives 552.2 meters=a.

Providing D and A in gives 4,496 meters=b.

Computing the tangent (a/b) provides that the plane is 7 degrees off its descent path, relative to the touchdown point.

The next step is to determine the horizontal angle between the glide slope and the path between the aircraft and the touchdown point. Viewed from the side, Earth curvature can be ignored without affecting the practical accuracy of the result.

The distance between the touchdown location and the point at runway height below point D has already been determined, which from this perspective is directly below point B. The height of point B is already determined, therefore there is a right angle triangle. Calculating the tangent ((182.88−4.572)/4496)=2.2735 provides the angle between the line from B to A and sea level. We take the difference of this and the glide slope and we find that the aircraft is 0.7265 degrees below the glide slope.

The difference between the vertical angle BAC and the horizontal angle DAE can then be taken. If this difference is outside a set of ranges defined in the application settings and the aircraft's height above ground is also below a predefined value set, then a warning can be issued.

The resulting angles are then used to determine whether a warning is provided to the pilot. For example:

When the aircraft is within 0.5 degrees vertically, no warning is given.

Between 0.5 and 1.0 degrees high and the required rate of descent to reach the glide slope appears.

Between 0.5 and 1.0 degrees low and the application starts displaying a vertical line to the glide slope.

Between 1.0 and 1.5 degrees off the high and low displays turn red. Outside of 1.5 degrees the high and low displays flash.

The particular values for the different types of display are preferably configurable by an operator by use of the user input 109.

Figure 10:
FIG. 10 shows an indication of aircraft deviation from a desired flight path.

For the parameters of the above approach example, a vertical line would be displayed to the pilot as illustrated in FIG. 10. There is also a collection of different display types that are provided to an operator for selection (such as a red vertical line) for display within the given boundaries.

For example, being more than half a degree too low may simply show a red line between the aircraft and the expected altitude while being more than one degree too low may cause the rendering of the aircraft on the display screen to flash red. Optionally, the warnings being displayed to the pilot may be graduated based on how far from the desired flight path they have deviated. For example, for a flight situation that is increasing in severity, the warnings may be escalated by combining larger warning displays and/or audio alerts.

For any aircraft on approach, determination and display of any vertical issues is precedent. However, issues in the horizontal angle may also be considered.

Aircraft Too High

When the aircraft is too high the processor is configured to determine the minimum altitude at which the aircraft must be on its glide slope. The altitude is preferably specified by an operator and input for processor use by the user interface 109. The minimum altitude defines a point on the glide slope where the aircraft must intercept to avoid being too high to the point where the rate of descent may be above a safe limit.

The processor 101 is configured to determine the time available to intercept with the flight path of the desired glide slope by dividing the horizontal distance between the aircraft and the intercept point by the horizontal speed of the aircraft.

The processor is further configured to determine the rate of descent required to get to the desired glide slope in time by dividing the vertical distance of the aircraft and this point by the time available.

The processor load created by this calculation is low. Therefore, this calculation may be updated constantly and output to the display device.

The required rate of descent can either be displayed as a simulated analogue display or as a vector pointing out the bottom of the aircraft, beside the actual rate of descent. This should give the end user a good idea of both the current required rate of descent and the way the rate of descent is trending.

Overshoot

The data required to calculate the overshoot is already available within an electronic flight bag.

A line is traced from the overshoot checkpoint to a point directly above the touchdown point, at the height at which an aircraft is required to abort a landing if it is not on track to land.

This line is calculated the same way as the end points on the straight line for the holds are connected with a line, except with the altitude changing uniformly along the line.

Calculation for Aircraft Divergence From a Curved Approach

The aircraft position is already known, along with the arc that the aircraft is following. The curves will almost certainly use a common formula (this is usually a bezier curve), meaning that derivatives and integrals do not need to be calculated. They can be derived directly from the constants inserted into them and will have a common form.

The first step is to compute a representation of the aircraft position in spherical coordinates, project the curve and aircraft position on to the sphere of radius 1, then convert the spherical coordinates to Cartesian coordinates.

The first step is to calculate is where on the curve the aircraft is. To do this, the general idea is to trace vectors perpindicular to the curve at each point on the curve and note the points that provide vectors which hit the aircraft. Since the curve is smooth and continuous curve, if the aircraft is within the scope of the curve, it must be hit by at least one of these perpindicular lines. The next step is to find which of these points is the nearest to the aircraft and how closely the aircraft heading matches the direction of the curve at each of these points and use that to decide what point the aircraft is on the curve.

To get the vectors perpindicular to each point, we consider the curve as a vector valued function $$f(t) = \begin{pmatrix} f_1(t) \\ f_2(t) \\ f_3(t) \end{pmatrix}$$

(in cartesian space). We take the derivative of this function, which will also be a vector valued function, say $$f'(t) = \begin{pmatrix} f_1'(t) \\ f_2'(t) \\ f_3'(t) \end{pmatrix}.$$

The plane on which the vectors lie is then defined by $$\begin{pmatrix} f_1(t) + xf_1'(t) \\ f_2(t) + yf_2'(t) \\ f_3(t) + zf_3'(t) \end{pmatrix}.$$

We then check that the aircraft lies on this plane via gaussian elimination. It is possible from this to construct formulae to test every point along a curve.

This will produce a set of points on the curve. It is worth noting that if an interval of points all have perpendicular vectors hitting the aircraft, every point in the interval must have the same distance to the aircraft. It should also be noted that since we projected onto a unit sphere before converting to cartesian coordinates we are only working with horizontal vectors. We then find two seperate values for each point with a perpindicular vector hitting the aircraft. The distance from each point on the curve to the aircraft is found via Pythagoras theorem. The difference in headings between the aircraft and the curve can be found by taking dot and cross products of the aircraft heading vector and the derivative of the curve. The vertical distance can also be found for each point by calculating the position of the point in spherical coordinates and subtracting the aircrafts height from the points height. To make a decision a weighting is assigned to each value, the values multiplied by the weightings and summed up. The point with the lowest resulting value is taken as the part of the curve the aircraft is currently on. It should be noted that almost all the time this will be a trivial decision. The weightings should be considered equivalent to what a neural network uses and are determined experimentaly.

Now we need to find the arc length of the curve to the selected point. We do this by taking the line integral of the curve (in spherical coordinates) from the runway to the selected point. We can now treat our curve as if it is a straight line.

We construct triangles in the vertical and horizontal plane from a straight line the same length as our curve and a perpindicular line representing the line from the selected point to the aircraft and apply basic trigonometry to get the vertical and horizontal angle of the aircraft off the curve, similarly to how the case for a straight descent is handled. The angles calculated are what the aircraft would intersect the curve on the runway at if it were to follow a path such that the distance from the aircraft to the curve decreased uniformly.

Glass Floor

According to a further embodiment, a further visual feature is optionally provided to the visual features described above. The visual feature is one of a glass floor is a visual indication of a safe low altitude limit. The glass floor will assist pilots in planning and assessment of their aircrafts altitude relative to the surrounding terrain along the aircraft's route. The glass floor visual feature may be useful in planned and unplanned situations, such as when a pilot is not flying along a prescribed path such as an arrival, approach, missed approach or departure.

The rendering of the glass floor may appear as a translucent region that overlays 3D terrain features. The translucent nature of the glass floor rendering allow pilots some ability to recognise terrain features that lie below.

In some embodiments, the glass floor is implemented as a surface with an altitude located a first threshold above terrain features. For example, the first threshold may be set to 1000 feet above the highest terrain feature in a predefined region. A second and higher altitude threshold may be implemented in regions where the terrain features are particularly hazardous. For example, mountainous terrain may have a 2000 ft threshold.

The predefined region could cover any useful surface area, such as 10 square miles. Therefore, the map terrain be constructed of a grid of regions, where each region has an associated highest terrain altitude within that region from which the altitude of the glass floor is determined, and a further parameter representing whether that grid includes hazardous terrain.

The number reflecting the minimum safe altitude within the grid will still be located on the chart (placed in a consistent location) for the pilots' easy reference. This will enhance pilots' situational awareness in flights departing and arriving at airports in mountainous or hilly terrain, particularly in non-radar environments, or in situations requiring descents in emergency or abnormal situations such as over mountainous or hilly terrain.

Figure 4:
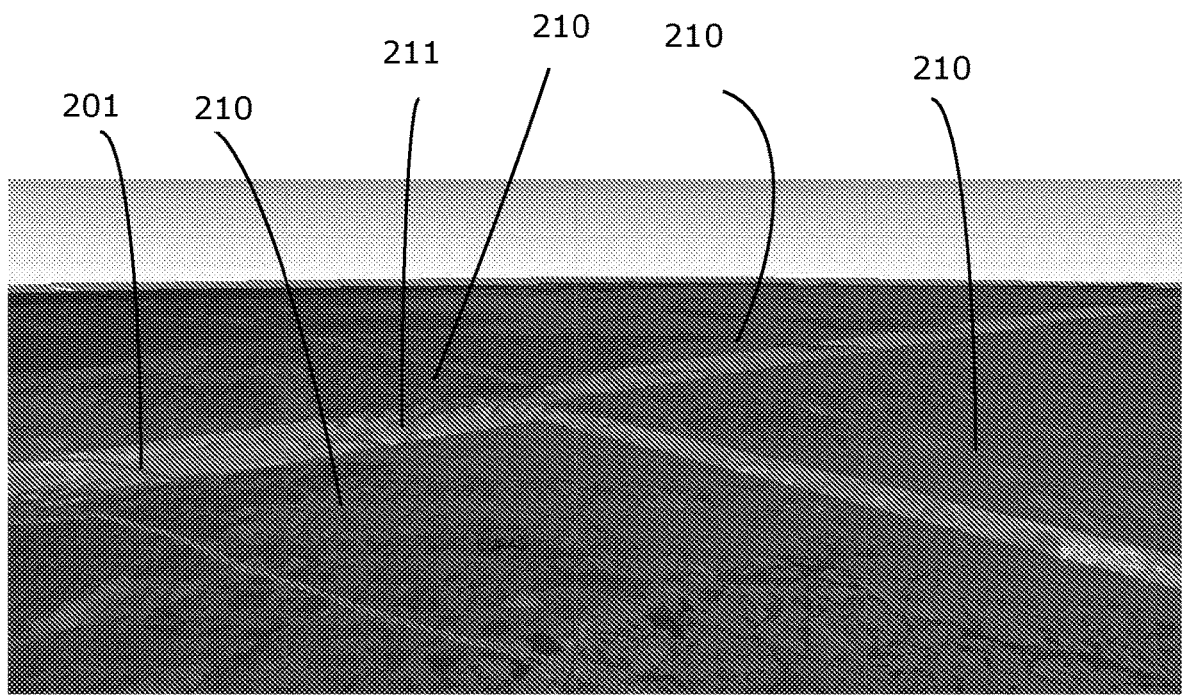
FIG. 4 shows an example of a glass floor visual feature.

FIG. 4 shows one example of four glass floor visual features 210 rendered to overlay a 3D terrain 211. The visual features 210 may be rendered proximate a predetermined flight path 201, or rendered proximate an aircraft position.

Figure 5:
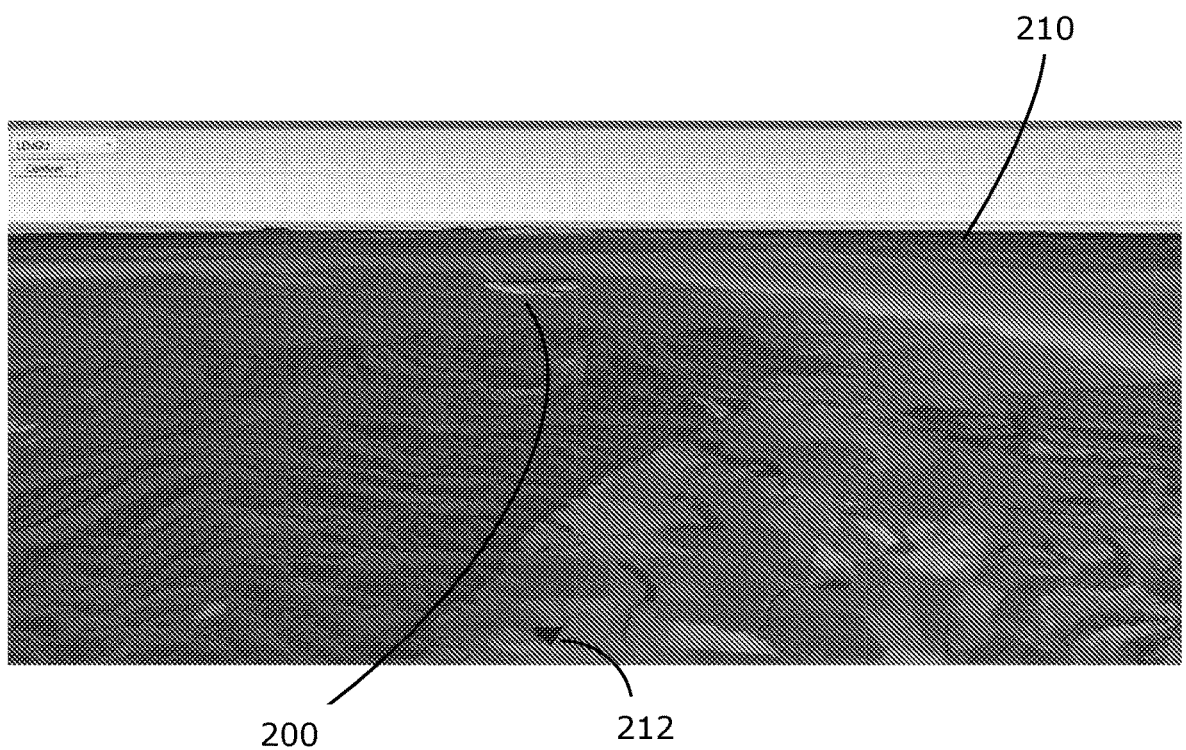
FIG. 5 shows an aircraft flying above a glass floor rendering.
Figure 6:
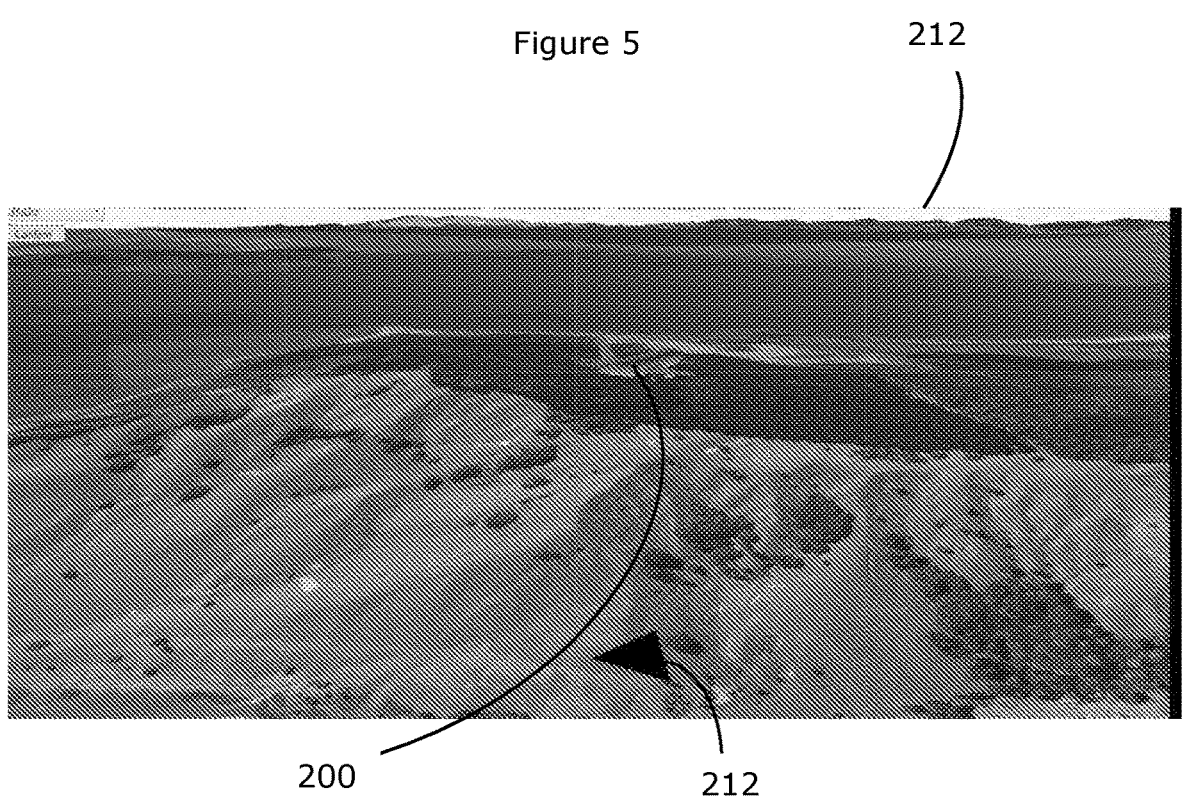
FIG. 6 shows an aircraft flying below the glass floor rendering.

An additional 'shadow' feature is rendered as a further visual reference indicating ground clearance to the pilot. FIG. 5 shows an aircraft flying above a glass floor rendering with a show 212 marker providing a visual altitude indication. FIG. 6 shows an aircraft flying below the glass floor rendering In most situations the Glass Floor feature will automatically be on. However, a pilot will have the option of selecting the Glass Floor presentation function either on or off. If off, the glass floor will, during descent, automatically appear on for several seconds once the aircraft descends to within a predetermined threshold of the minimum safety altitude.

During climb out the aircraft typically will be above the minimum safety altitude by the time the pilot transfers to an En Route chart.

To implement the glass floor, the processor 101 is configured to receive data relating to the present aircraft position 107, flight plan information 105, and terrain data 103. The processor 101 is configured to reference a surface area grid of the terrain data 103 and determine an altitude threshold. The altitude threshold is used to determine the location the glass floor is to be rendered. The processor 101 renders the glass floor on the display 102 as a graphical overlay to over renderings such as the terrain and aircraft position. The processor may render the glass floor of a variety of colours. However, colours associated with warnings such as red or yellow are preferred. The colour of the glass floor rendering may be changed depending on one or more variables such as whether the aircraft is above or below the altitude threshold.

The processor 101 may be further configured to generate one or more warnings based on the aircraft flying below the altitude threshold. For example, a graphical warning indicator or audible alarm may be triggered when the aircraft is below the altitude threshold.

Arrival or Departure Display

Further applications of the flight path display relative to the 3D terrain includes the display of arrival and departure flight paths. For example, the display may depict the required flight path along with the minimum restrictive altitudes for the departure or arrival of the aircraft from/to the selected aerodrome, along with the aircrafts actual position. At all times the aircrafts position relative to the surrounding terrain is in view.

The pilot can select to display any operator special departure procedure to be used in the event of a loss or performance during the departure from an airport. This special procedure can be selected via the user interface 109.

In the planning mode the operator can select an aerodrome arrival or departure procedure from the library/ database and by use of a touch-screen or mouse device and move the aircraft view along the intended flight path. The intended or required flight path displays any altitude, distance, tracking or speed requirements. Actual wind conditions, determined by the aircrafts systems, can be displayed so as to enable the operator to gain an advance view of what can be expected along the flight path, for example, in the event of a strong crosswind on final approach, where the runway will appear relative to the pilot's line-of-sight.

In the flight mode, the aircraft actual position is displayed relative to the required flight path and to the surrounding terrain.

Figure 11:
FIG. 11 shows a sequence of images depicting a real life CFIT example.
Figure 11:
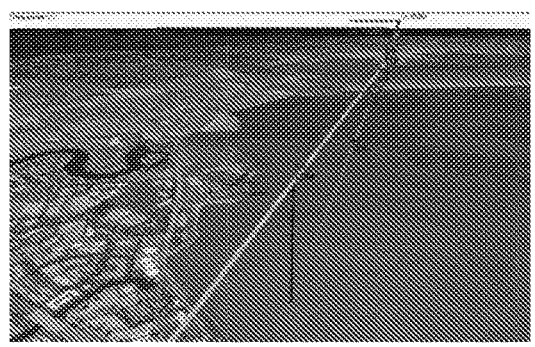
Figure 11:
Figure 11:
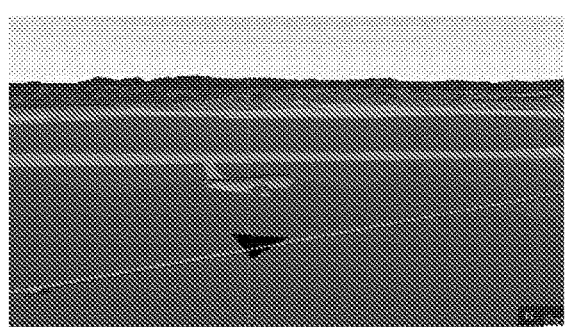

FIGS. 11(a) to 11(d) show an exemplary visual representation of the desired approach position relative to the actual aircraft position of Asiana Airlines Flight 214 to San Francisco airport on Jul. 6, 2013, a flight that concluded with Flight 214 crashing into a sea wall short of the runway. The Flight 214 NTSB crash report stated that the flight crew mismanaged the initial approach and that the airplane was well above the desired glide path as shown in FIGS. 11(a) to (c). In response, the captain selected an inappropriate autopilot mode, which, without the captain's awareness, resulted in the autothrottle no longer controlling airspeed. The aircraft then descended below the desired glide path as shown in FIG. 11(d) with the crew unaware of the decreasing airspeed.

The prescribed glideslope on the depicted approach is 2.85°. Had this slope been shown to the pilots relative to the aircraft position, the pilots would have been visually assisted with their approach.

In particular, FIG. 11(a) shows the aircraft is about 7 miles from the threshold and is above the required glide-path. To achieve the desired glide-path, the aircraft needs to descend at a rate of 1241 feet per minute.

FIG. 11(b) shows the aircraft about 5 miles from the runway threshold where he should be at 1504 ft above ground level. At predetermined points on the visual flight path, the distance to the touchdown location and the desired altitude at that point is shown at that point together with a vertical line between the ground and the desired path. Here, the aircraft is above the prescribed glide-path. To achieve the required glide path, the aircraft has to descend at a rate of 1184 feet per minute.

FIG. 11(c) shows the aircraft has not descended as required and is still above the desired glide-path. Now the required rate of descent has increased to 1434 feet per minute. The rate of descent required to match the desired flight path by the touch down location is shown next to the aircraft together with a visual indication of the direction (higher or lower) that the aircraft must go.

FIG. 11(d) shows that the aircraft is below the desired flight path and needs to climb or risk impacting the ground.

Display of the aircraft and surrounding terrain features provides visualisation of many parts of an entire flight including the provided examples of departure, arrival, approach, holding pattern if required and missed approach if required.

Each of the flight parts may be rendered as a desired flight path relative to the surrounding terrain in a continuous manner, rather than individual scenarios. In this way, CFIT situations can be mitigated by providing the pilot with a visual representation of the desired flight path through various phases of flight relative to their aircraft position.

Embodiments of the present invention have been described in terms of functional block diagrams and various processing steps. It should be appreciated that such functional blocks may be realised in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices.

Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be apparent, however, to those skilled in the art that many more modifications besides those already described are possible without departing from the inventive concepts herein. The inventive subject matter, therefore, is not to be restricted except in the spirit of the disclosure.

Where in the foregoing description reference has been made to elements or integers having known equivalents, then such equivalents are included as if they were individually set forth. Although the invention has been described by way of example and with reference to particular embodiments, it is to be understood that modifications and/or improvements may be made without departing from the scope or spirit of the invention.

The invention claimed is:

1. A system for use on a flight deck of an aircraft comprising:
a display operable for graphical display of data to a pilot of the aircraft; and
a processor operatively coupled to the display and configured to receive:
chart data from a source of navigational data, the chart data comprising at least two waypoints, each waypoint having location and altitude data defining a three-dimensional position; and
aircraft position data from one or more aircraft sensors, the aircraft position data comprising aircraft location, altitude, heading, track, pitch and roll data;
wherein the processor is configured to:
determine the aircraft location;
display a three-dimensional representation of a flight path between the at least two waypoints via said display;
determine an aircraft attitude from the aircraft position data;
display a representation of an attitude of the aircraft relative to the three-dimensional representation of the flight path via said display; and
generate a first warning when the aircraft is outside one or more of a horizontal displacement from the flight path, a vertical displacement from the flight path or both, the first warning comprising one or more of a visual alert, an audible alert or both,
wherein the processor is further configured to:
determine a deviation of the aircraft from the flight path, then prompt the pilot to regain the flight path by displaying one or more parameters; and
generate a second warning when the aircraft is outside one or more of a horizontal angular displacement threshold from the flight path, a vertical angular displacement threshold from the flight path or both, wherein the horizontal angular displacement from the flight path is determined by a horizontal angular difference between:
an angle formed by a first vector from a touchdown location to the aircraft and a second vector horizontal to the altitude of the touchdown location, and
an angle formed by a third vector from the touchdown location to a desired aircraft position and the second vector horizontal to the altitude of the touchdown location,
wherein prompting the pilot to regain the flight path comprises displaying a required rate of descent on the display as a fourth vector pointing out of a bottom of an aircraft symbol beside an actual rate of descent of the aircraft and constantly updating the display of the fourth vector and the actual rate of descent of the aircraft responsive to aircraft motions initiated by the pilot.

2. The system as claimed in claim 1, wherein the system further comprises:
three-dimensional terrain data from at least a terrain data base, the three-dimensional terrain data comprising terrain altitude data and location data representative of geographical terrain features;
wherein the processor is configured to:
display a three-dimensional representation of a terrain at least proximate the location of the aircraft, the representation derived from the terrain altitude data and location data; and
display a representation of the aircraft attitude relative to the three-dimensional representation of the flight path and the three-dimensional representation of the terrain.

3. The system as claimed in claim 1, wherein displaying the one or more parameters operable to regain the flight path comprises displaying a graphical indication of an altitude difference between the aircraft and the flight path.

4. The system as claimed in claim 1, wherein the processor is configured to, during an airport approach flight phase:
determine whether the aircraft is above or below the flight path and determine a desired rate of ascent or descent of the aircraft that will intercept the flight path at or before a runway, and
the processor is further configured to operate the display to show a representation of the desired rate of ascent or descent of the aircraft.

5. The system as claimed in claim 1, wherein a vertical angular displacement from the flight path is determined by a vertical angular difference between:
an angle formed by a vector from a touchdown location to the aircraft and a vector horizontal to the altitude of the touchdown location, and
an angle formed by a vector from the touchdown location to a desired aircraft position and the vector horizontal to the altitude of the touchdown location.

6. The system as claimed in claim 1, wherein the processor is further configured to:
determine the aircraft is above the desired flight path;
determine a touchdown location and altitude;
determine a glide slope for the aircraft to meet a touchdown point; and
output a warning if the determined glide slope is above a predetermined safe limit.

7. The system as claimed in claim 1, wherein the processor is further configured to allocate a surface area grid to terrain located below the aircraft,
receive data relating to a peak altitude of the terrain and a terrain risk parameter for each segment of the grid from the terrain database, and
display a representation of a floor at an altitude above the peak in each grid segment according to the risk parameter of the terrain in that respective grid segment.

8. The system as claimed in claim 7, wherein the risk parameter is deemed high for mountainous terrain located in a grid segment, and the representation of the floor is displayed at a higher altitude for grid segments with a high risk parameter.

9. The system as claimed in claim 7, wherein the representation of the floor is displayed at a terrain altitude of 2000 feet for grid segments with a high risk parameter; wherein the representation of the floor is displayed at a terrain altitude of 1000 feet for grid segments that do not have a high risk parameter; or both.

10. The system as claimed in claim 7, wherein the representation of the floor is a translucent region that overlays the terrain in each grid segment.

11. The system as claimed in claim 7, wherein the representation of a floor is displayed at a first colour when the aircraft is located above the floor, and another colour when the aircraft is located below the floor; wherein processor is configured to generate an audible warning, visual warning or both when the aircraft is located below the floor.

12. A method of generating a visual display for use on a display on a flight deck of an aircraft and being operable for graphical display of data to a pilot of the aircraft, the method comprising:
  receiving three-dimensional terrain data from at least a terrain data base, the three-dimensional terrain data comprising terrain altitude data and location data representative of geographical terrain features;
  receiving chart data from a source of navigational data, the chart data comprising at least two waypoints, the waypoints having location and altitude data defining a three-dimensional position;
  receiving aircraft position data from one or more aircraft sensors, the aircraft position data comprising aircraft location, altitude, heading, track, pitch and roll data;
  then:
    determining the aircraft location;
    displaying a three-dimensional representation of a terrain at least proximate the location of the aircraft, the representation derived from the terrain altitude data and location data via the display;
    displaying a three-dimensional representation of a flight path relative to the three-dimensional representation of the terrain determined as the path between the at least two waypoints via the display;
    determining an aircraft attitude from the aircraft position data;
    displaying a representation of the aircraft attitude relative to the three-dimensional representation of the flight path and terrain via the display;
    generating a first warning when the aircraft is outside one or more of a horizontal displacement from the flight path, a vertical displacement from the flight path or both;
    determining a deviation of the aircraft from the flight path, then prompting the pilot to regain the flight path by displaying one or more parameters; and
    generating a second warning when the aircraft is outside one or more of a horizontal angular displacement threshold from the flight path, a vertical angular displacement threshold from the flight path or both, wherein the horizontal angular displacement from the flight path is determined by a horizontal angular difference between:
      an angle formed by a first vector from a touchdown location to the aircraft and a second vector horizontal to the altitude of the touchdown location, and
      an angle formed by a third vector from the touchdown location to a desired aircraft position and the second vector horizontal to the altitude of the touchdown location,
    wherein prompting the pilot to regain the flight path comprises displaying a required rate of descent on the display as a fourth vector pointing out of a bottom of an aircraft symbol beside an actual rate of descent of the aircraft and constantly updating the display of the fourth vector and the actual rate of descent of the aircraft responsive to aircraft motions initiated by the pilot.

* * * * *